United States Patent
Kouznetsov et al.

(10) Patent No.: US 7,240,102 B1
(45) Date of Patent: Jul. 3, 2007

(54) SYSTEM AND METHOD FOR PROVIDING WEB BROWSER-BASED SECURE REMOTE NETWORK APPLIANCE CONFIGURATION IN A DISTRIBUTED COMPUTING ENVIRONMENT

(75) Inventors: Victor Kouznetsov, Aloha, OR (US); Michael Chin-Hwan Pak, Portland, OR (US); Daniel J. Melchione, Beaverton, OR (US); Nicholas C. W. Hogle, Corvallis, OR (US)

(73) Assignee: McAfee, Inc., Santa Clara, CA (US)

( * ) Notice: Subject to any disclaimer, the term of this patent is extended or adjusted under 35 U.S.C. 154(b) by 544 days.

(21) Appl. No.: 10/057,709

(22) Filed: Jan. 25, 2002
(Under 37 CFR 1.47)

Related U.S. Application Data (60) Provisional application No. 60/309,835, filed on Aug. 3, 2001, provisional application No. 60/309,858, filed on Aug. 3, 2001.

(51) Int. Cl.
*G06F 15/177* (2006.01)

(52) U.S. Cl. .................. 709/220; 709/221; 709/222; 709/223; 709/228

(58) Field of Classification Search ............. 709/220, 709/221, 222, 223, 228
See application file for complete search history.

(56) References Cited

U.S. PATENT DOCUMENTS

| | | | |
|---|---|---|---|
| 5,974,454 A | 10/1999 | Apfel et al. ............. 709/221 |
| 6,123,737 A | 9/2000 | Sadowsky ................. 717/173 |
| 6,260,078 B1* | 7/2001 | Fowlow ..................... 719/332 |
| 6,345,294 B1* | 2/2002 | O'Toole et al. ............ 709/222 |
| 6,480,955 B1* | 11/2002 | DeKoning et al. .......... 713/100 |
| 6,725,261 B1* | 4/2004 | Novaes et al. ............. 709/220 |
| 6,772,420 B1* | 8/2004 | Poger et al. .............. 719/327 |
| 6,782,474 B1* | 8/2004 | Ylonen ..................... 713/162 |
| 6,834,298 B1* | 12/2004 | Singer et al. .............. 709/220 |
| 2002/0198969 A1* | 12/2002 | Engel et al. ............... 709/220 |
| 2003/0023732 A1* | 1/2003 | Cohen ....................... 709/229 |

OTHER PUBLICATIONS

Office Action from U.S. Appl. No. 10/056,702 mailed Nov. 3, 2005.
Office Action from U.S. Appl. No. 10/057,875, mailed Jan. 22, 2007.

* cited by examiner

*Primary Examiner*—Rupal Dharia
*Assistant Examiner*—Nicholas Taylor
(74) *Attorney, Agent, or Firm*—Zilka-Kotab, PC; Christopher J. Hamaty (57) ABSTRACT

A system and method for providing Web browser-based remote network appliance configuration in a distributed computing environment is described. A query message is broadcast from an applet executing within a Web browser to one or more network appliances. The network appliances are interconnected within a bounded network domain defined by a common network address space. A response message containing network settings, including a physical network address, is received by the applet from at least one such network appliance responsive to the query message and processed. A configuration packet is generated and sent using the physical network address for each at least one such network appliance sending a response message and requiring configuration.

32 Claims, 10 Drawing Sheets

SYSTEM AND METHOD FOR PROVIDING WEB BROWSER-BASED SECURE REMOTE NETWORK APPLIANCE CONFIGURATION IN A DISTRIBUTED COMPUTING ENVIRONMENT

CROSS-REFERENCE TO RELATED APPLICATIONS

This patent application is a conversion of U.S. provisional patent applications, Ser. No. 60/309,835, filed Aug. 3, 2001, pending; and Ser. No. 60/309,858, filed Aug. 3, 2001, pending; the priority dates of which are claimed and the disclosures of which are incorporated by reference.

FIELD OF THE INVENTION

The present invention relates in general to secure network appliance configuration and, in particular, to a system and method for providing Web browser-based secure remote network appliance configuration in a distributed computing environment.

BACKGROUND OF THE INVENTION

Enterprise computing environments generally include both localized intranetworks of interconnected computer systems and resources internal to an organization and geographically distributed internetworks, including the Internet. Intranetworks make legacy databases and information resources available for controlled access and data exchange. Internetworks enable internal users to access remote data repositories and computational resources and allow outside users to access select internal resources for completing limited transactions or data transfer.

Increasingly, network appliances, or simply "appliances," are being deployed within intranetworks to compliment and extend the types of services offered. As a class, network appliances have closed architectures and often lack a standard user interface. These devices provide specialized services, such as electronic mail (email) anti-virus scanning, content filtering, file, Web and print service, and packet routing functions.

Ideally, network appliances should be minimal configuration devices, which are purchased, plugged into a network, and put into use with no further modification or change. Analogous to a cellular telephone, a network appliance should ideally provide the service promised without requiring involved configuration and setup by individual users or administrators.

Nevertheless, configuring newly-installed appliances remains a complicated and confusing endeavor. Appliance configuration is generally vendor-specific and device-dependent. The lack of a user interface allows only indirect configuration and setup. Configuration often takes several steps. From a physical connectivity standpoint, appliance configuration typically requires operating a manual control panel, reconfiguring an installed appliance from a factory set of default settings or performing a myriad of other device-dependent operations to affect a configured setup. Consequently, a higher than average level of user sophistication is required to avoid a confusing, incorrect or potentially catastrophic outcome.

In addition, operational software and firmware must also be properly configured as part of an initial setup. Often, a full software suite, including operating system, must be installed prior to initializing the appliance. In addition, the network protocol stack must be configured to operate within the specific installed network topology into which the device is deployed.

Finally, various policies must be installed and operationally enforced on each appliance. Appliances offering plug-and-play installation generally lack the default settings necessary to enforce security and administrative policies. As well, until fully configured, these devices enjoy potentially free rein over a network domain and pose a serious security risk to an entire enterprise.

For instance, replay attacks are possible during device configuration. A configuration packet could be intercepted by a hostile agent and later re-sent ("replayed") with altered settings to reset the configuration and create a security breach.

In addition to per-device configuration and setup considerations, the deployment of appliances can create network management concerns. For instance, a large population of deployed appliances can drastically increase network management workload. Vendor-specific and device-dependent settings necessitate individualized attention to each successive appliance installation. A rich network environment having a multitude of heterogeneous systems and appliances can quickly overwhelm a network administrator and make the task of identifying unconfigured devices difficult and time consuming.

In the prior art, the dynamic host configuration protocol (DHCP) provides a partial solution. DHCP allows a TCP/IP-compatible device to be dynamically assigned a network address within a pre-defined network domain. A DHCP server maintains a table of the network addresses assigned to each interconnected device, thereby preventing address conflicts. Network address assignments are "pushed" to each newly-connected device. However, DHCP servers are limited to configuring network addresses and fail to provide policy and device parameter configuration and setup.

Therefore, there is a need for an approach to providing remote secure configuration of network appliances from a standardized user interface. Preferably, such an approach would offer a Web browser-based solution allowing configuration from a ubiquitous and widely available interfacing means. Such an approach would further provide a standardized interface for appliance configuration and setup in a vendor-neutral and device-independent fashion.

There is a further need for an approach to providing automatic configuration of network appliances during initialization upon deployment into a network domain. Preferably, such an approach would provide a complete bootstrap solution with minimal user interaction. Furthermore, such an approach would preferably realize a cellular telephone service model of purchase, plug in and use.

There is a further need for an approach to providing network-based configuration of network appliances that substantially minimizes the potential for creating security risks and, in particular, preventing replay attacks.

SUMMARY OF THE INVENTION

The present invention provides a system and method for remotely configuring a network appliance deployed within a network domain. A configuration client executes a Web browser upon which is loaded an applet for performing remote appliance configuration. The applet is initially retrieved from a centralized network operations center, which maintains a set of applets customized for each separate network domain and individual configurations for various network appliances. The configuration client, via the applet, broadcasts a "ping" query message to all appliances and receives back from each a response indicating a configuration state. An appliance configuration for each unconfigured network appliance is requested from the network operations center. The network operations center returns configuration parameters to the configuration client and a configuration packet is sent to each unconfigured appliance. Upon the successful configuration of each appliance, the configuration client instructs the appliance to begin a remote management session. Otherwise, the configuration packet is resent or the configuration client waits for the installation to complete.

An embodiment of the present invention provides a system and a method for providing Web browser-based remote network appliance configuration in a distributed computing environment. A query message is broadcast from an applet executing within a Web browser to one or more network appliances. The network appliances are interconnected within a bounded network domain defined by a common network address space. A response message containing network settings, including a physical network address, is received by the applet from at least one such network appliance responsive to the query message and processed. A configuration packet is generated and sent using the physical network address for each at least one such network appliance sending a response message and requiring configuration.

A further embodiment provides a system and method for remotely configuring a network appliance deployed within a distributed computing environment. A response message containing network settings is sent from at least one network appliance responsive to a query message broadcast over a specified network domain within which the at least one network appliance operates. A configuration package for the at least one network appliance is generated. The configuration package contains centrally managed network settings customized for the at least one network appliance. The configuration package is installed on the at least one network appliance as part of an initialization bootstrap operation.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
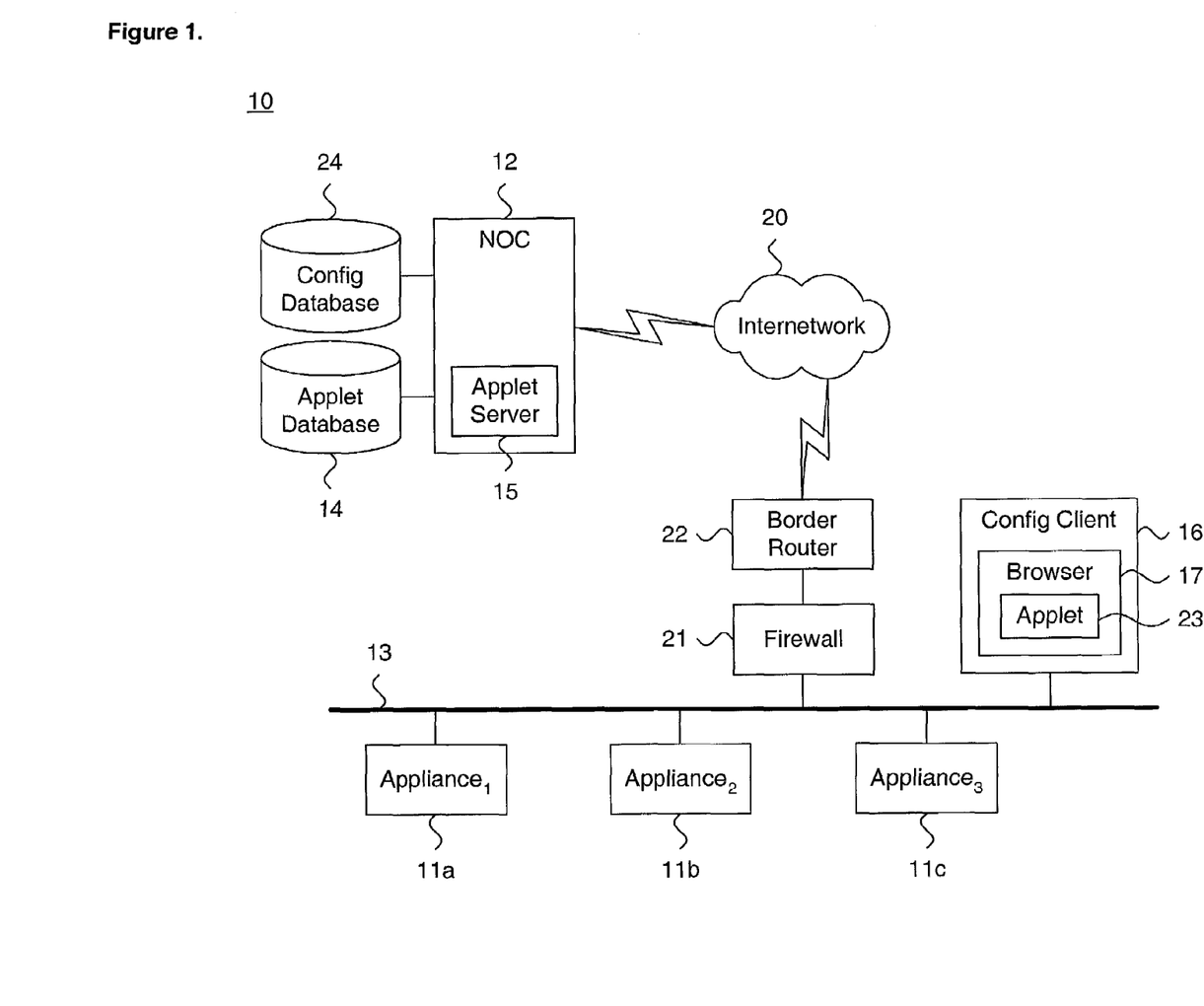
FIG. 1 is a block diagram showing a system for providing Web browser-based secure remote network appliance configuration in a distributed computing environment.

FIG. 1 is a network diagram 10 showing a system for providing Web browser-based secure remote network appliance configuration in a distributed computing environment, in accordance with the present invention. The distributed computing environment is preferably TCP/IP compliant. A plurality of individual network appliances (or simply "appliances") 11a–c are interconnected via an intranetwork 13. Each of the appliances 11a–c is autonomously configured and provides specified functionality, such as electronic mail (email) anti-virus scanning, content filtering, packet routing, or file, Web, or print service. Other forms of appliance services are feasible, as would be recognized by one skilled in the art.

In addition to providing the specified functionality, the various appliances 11a–c are autonomously self-configured and self-managed, as further described below beginning with reference to FIG. 4. The appliances 11a–c are remotely configured through a configuration client 16 executing within a bounded network domain defined by a common network address space. The configuration client 16 includes a Web browser 17 upon which an applet 23 executes to transparently install and configure each of the interconnected appliances 11a–c.

Upon the physical connection of each new appliance 11a–c onto the intranetwork 13, an administrator executes a configuration application on the configuration client 16 via the Web browser 17. The Web browser 17 provides a user-friendly and standardized user interface for configuring appliances 11a–c in a device-independent and vendor-neutral manner. The configuration application executes the applet 2, which broadcasts a "ping" query message to all appliances 11a–c on the intranetwork 13. In response, each appliance 11a–c sends a response back to the configuration client 16, which then determines those appliances 11a–c requiring configuration and setup.

For each unconfigured appliance 11a–c, the configuration client 16 requests configuration parameters from a centralized network operations center (NOC) 12 in a secure session.

The network operations center 12 determines the parameters necessary to properly configure the unconfigured appliance 11a–c in accordance with applicable security and administration policies. The configuration parameters are sent to the requesting configuration client 16. Upon receiving the set of configuration parameters for each new appliance 11a–c, the configuration client 16 generates a configuration packet, which is customized for and sent to each unconfigured appliance 11a–c. Upon the successful installation of each configuration packet by the appliances 11a–c, the configuration client 16 sends a "kick-start" packet to initiate a secure remote management session on each appliance 11a–c, such as described in commonly-assigned related U.S. patent application Ser. No. 10/056,702, entitled "System And Method For Providing A Framework For Network Appliance Management In A Distributed Computing Environment," filed Jan. 25, 2002 the disclosure of which is incorporated by reference.

The appliance configuration performed by the configuration client 16 is system independent and can be executed by any client interconnected within the same network domain as the appliances being configured. Accordingly, each new configuration client 16 initially requests an applet from an applet server 15 executing on the network operations center 12 via a secure session. The applet server 15 is coupled to an applet database 14 to allow customization of the configuration functions performed within each individual network domain. Upon receipt of the applet, the configuration client 16 can proceed to configure the individual appliances 11a–c.

Each appliance 11a–c is interconnected via an intranetwork 13 which is, in turn, interconnected to an internetwork 20, including the Internet, via a firewall 21 and border router 22. The configuration client 16 is also interconnected via the intranetwork 13 and shares the same network domain with the appliances 11a–c. The network operations center 12 is external to the intranetwork 13 and is only accessible as a remote host via the internetwork 20. Accordingly, the configuration parameter and applet request functions are transacted with each appliance 11a–c in a secure session, preferably using the Secure Hypertext Transport Protocol (HTTPS). Other network configurations, topologies and arrangements of clients and servers are possible, as would be recognized by one skilled in the art.

The individual computer systems, including servers and clients, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs and data, are loaded into the RAM for execution and processing by the CPU and results are generated for display, output, transmittal, or storage.

Figure 2:
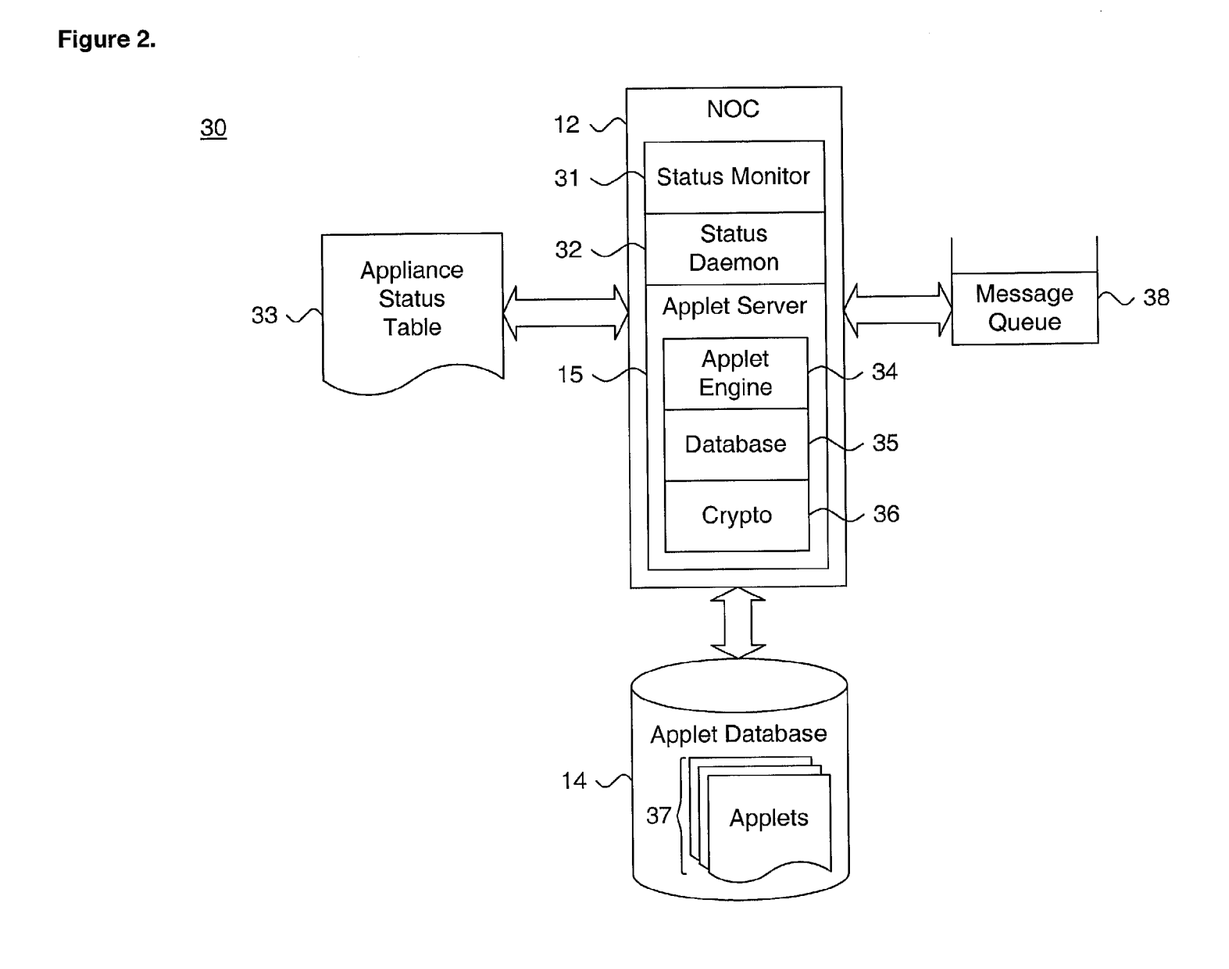
FIG. 2 is a block diagram showing the software modules of the network operations center of FIG. 1.

FIG. 2 is a block diagram showing the software modules 30 of the network of FIG. 1. The network operations center 12 includes three modules: status monitor 31, status daemon 32 and applet server 15. The applet server 15 executes as part of the network operations center 12. The status monitor 31 receives periodic status reports from the individual network appliances 11a–c (shown in FIG. 1). Each status report is recorded and registered in an appliance status table 33, which notes the appliance user identifier (UID) and time of each report. The status daemon 32 executes as an independent process that periodically awakens and examines the appliance status table 33 to determine whether any of the appliances 11a–c have failed to report. As necessary, an alert is generated to inform an administrator of a potentially faulty appliance.

The applet server 15 includes three modules: applet engine 34, database 35, and crypto 36. The applet engine 34 downloads individual applets 23 maintained in the applet database 14 to requesting configuration clients 16 (shown in FIG. 1) via a secure session. A library of applets 37 are maintained to allow customization of the various configuration applications executing within the Web browsers 17 each configuration client 16.

The database module 35 interfaces to the applet database 14 to access the applets 37 maintained therein. In the described embodiment, the applet database 14 is a structured query language (SQL) based database. The applets 37 are stored as structured records indexed by client identifiers.

The crypto module 36 provides asymmetric (public key) and symmetric encryption. Both forms of cryptography are needed to transact a secure session with each appliance 11a–c. As well, the network operations center 12 uses the crypto module 36 to digitally sign and encrypt the applets 37.

The network operations center 12 includes a message queue 38 through which instructions to the applets 23 (shown in FIG. 1) deployed on the individual configuration clients 16 are communicated. The configuration clients 16 execute in an event-driven manner. Periodically, each configuration client 16 checks the message queue 38 for new instructions which are transparently executed by the applet 23.

In the described embodiment, five types of messages are communicated between the network operations center 12 and the configuration clients 16, as follows:

sendRefresh( ): Sends a message to message queue 38 instructing the applet 23 to refresh the list of appliances 11a–c that are on the network.

SendKick( ): Sends a message to message queue 38 instructing the applet 23 to send out a kick-start packet to the appliance 11a–c with the given media access controller (MAC) address.
Parameters:
  MAC: The MAC address of the appliance 11a–c to which the kick-start packet will be sent. Should be in "AA:BB:CC:00:11:22" format.

sendConfig( ): Sends a message to message queue 38 instructing the applet 23 to send a "CONFIG" configuration packet to the appliance 11a–c with the given MAC address.
Parameters:
  MAC: The MAC address of the appliance 11a–c to which the configuration packet will be sent. Should be in "AA:BB:CC:00:11:22" format.
  Hostname: Value to be assigned as the hostname.
  Domain: Value to be assigned as the domain name.
  IP: Value to be assigned as the IP address.
  Netmask: Value to be assigned as the network mask.
  Gateway: Value to be assigned as the internet gateway.
  DNS1: Primary domain-name server.
  DNS2: Secondary domain-name server.

String getList( ): Returns a list of select appliances 11a–c with current network configuration in an internal appliance list in a configuration client 16.
Parameters:
  Filter: Value that determines which appliances 11a–c are returned. If the value is "0," all appliances are returned; and if the value is "2," only configured appliances are returned
Return Value:
  The return value is a String that contains the select appliances, and current configuration information. The return value is a pipe-symbol ("|") delimited for every network parameter. An example return value is:
    00:B0:D0:11:22:33:test1,mycio.com,127.0.0.1,
      255.255.255.
    128,0.0.0.0,0.0.0.0,0.0.0.0|00:11:22:33:44:55:test2,
    mycio.com,127.0.0.1,255.255.255.128,0.0.0.0.0,
      0.0.0.0 getStatus( ): Returns the status of the sendConfig message. Returns "0" if no SUCCESS or FAILED packet has yet been received from an appliance 11a–c; "1" if a SUCCESS packet was received; and "–1" if a FAILED packet was received.

Figure 3:
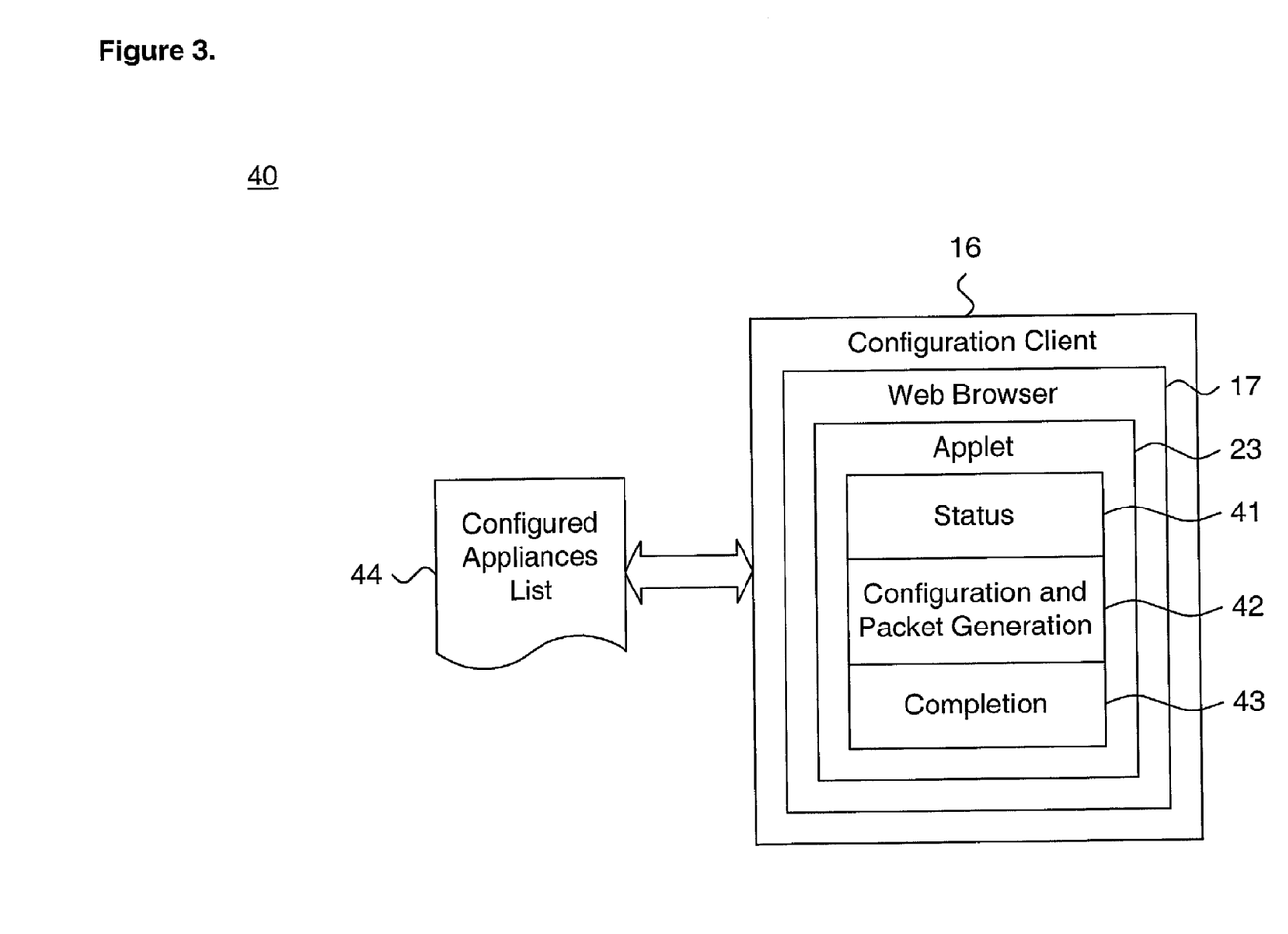
FIG. 3 is a block diagram showing the software modules of the configuration client of FIG. 1.

FIG. 3 is a block diagram showing the software modules 40 of a configuration client 16 of FIG. 1. The configuration client 16 includes a Web browser 17 executing an applet 23. In the described embodiment, the Web browser 17 is a HTML-compatible Web browser, such as the Internet Explorer, licensed by Microsoft Corporation, Redmond, Wash., capable of executing downloadable programs, including applets, written in an interpretable programming language, such as the Java programming language.

The applet includes three functional modules: status 41, configuration and packet generation 42, and completion 43. The status module 41 broadcasts a query message to the interconnected network appliances 11a–c (shown in FIG. 1) and processes response messages received back to determine the configuration of each appliance 11a–c. The status of each appliance 11a–c is maintained in a configured appliances list 44. The configuration and packet generation module 42 receive configuration parameters from the network operations center 12 (shown in FIG. 1) and generates a configuration packet for downloading to an unconfigured appliance 11a–c. The completion module 43 receives a status message from each unconfigured appliance 11a–c indicating whether the configuration packet was successfully installed. A configuration packet will be re-sent to any appliance 11a–c that fails to successfully complete configuration.

Figure 4:
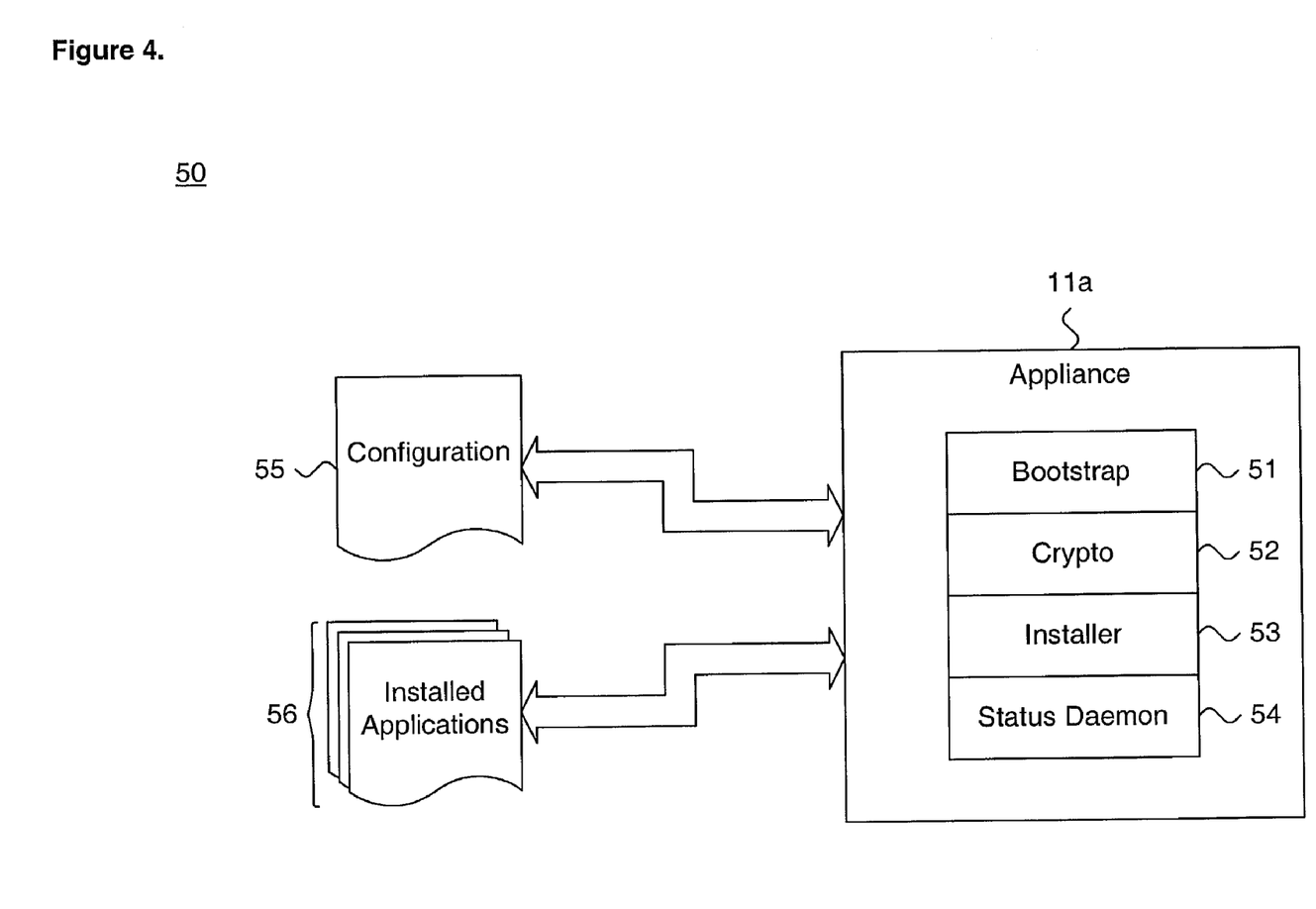
FIG. 4 is a block diagram showing the software modules of an exemplary network appliance of FIG. 1.

FIG. 4 is a block diagram showing the software modules 50 of an exemplary network appliance 11a of FIG. 1. Application-specific logic has been omitted for clarity. As pertains to autonomous configuration and management, each network appliance 11a includes four modules: bootstrap module 51, crypto 52, installer 53, and status daemon 54. The bootstrap module 51 executes upon the initial installation of the appliance 11a onto the intranetwork 13. The bootstrap module 51 sends a response message in reply to a broadcasted "ping" query message from the configuration client 16. The response message includes the current configured network settings in use by the appliance 11a. For an unconfigured appliance 11a, the response packet includes only the media access controller (MAC) address used by the appliance 11a. As well, the bootstrap module 51 sends a response message to any subsequent query messages sent by the configuration client 16 and includes all currently in-use configured network settings, as maintained in the appliance configuration 55.

Upon receiving a configuration packet from the configuration client 16, the bootstrap module 51 installs and sets up the various software applications to be executed by the appliance 11a. The software can include the operating system and any application-specific logic integral to providing the service performed by the appliance 11a. Through the use of the network operations center 12 and configuration client 16, the appliance 11a can be configured and managed remotely and in compliance with applicable security and administrative policies. Accordingly, the autonomous configuration and self-management of each network appliance 11a–c can enable a vendor to provide a complete service model, whereby installations are handled autonomously and without significant end-user intervention.

The crypto module 52 provides asymmetric (public key) and symmetric encryption. Both forms of cryptography are needed to transact a secure session with the network operations center 12 and a component server (not shown) used to manage and update the suite of applications 56 installed on the appliance 11a. The installer 53 installs applications received from a component server. Finally, the status daemon 54 periodically awakens and sends a report of the health and status of the network appliance 11a to the network operations center 12. The status report identifies the reporting appliance 11a and provides machine-specific data, including the load on the processor, available disk space and application-specific information, such as the number of emails passing through the device. The status report is referred to as a "SecureBeat."

Each software module of the network operations center 12, configuration client 16 and exemplary appliance 11a is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The network operations center 12, configuration client 16 and exemplary appliance 11a operate in accordance with a sequence of process steps, as further described beginning below with reference to FIG. 7.

Figure 5:
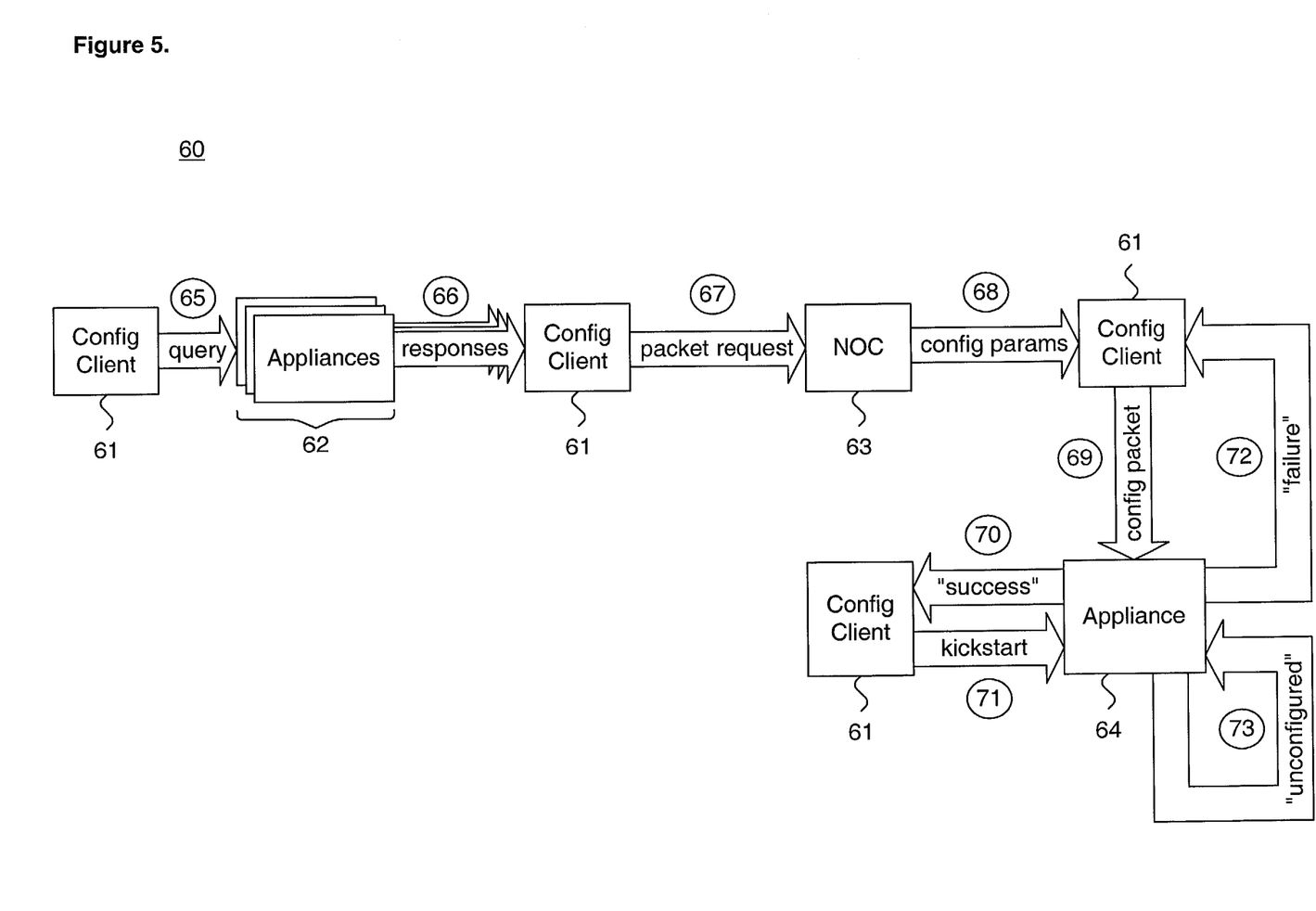
FIG. 5 is a process flow diagram showing a remote network appliance configuration, as performed by the system of FIG. 1.

FIG. 5 is a process flow diagram showing a remote network appliance configuration, as performed by the system of FIG. 1. Each network appliance is autonomously configured by a configuration ("config") client 61. Upon the installation of a new appliance on the intranetwork 13 (shown in FIG. 1), or as necessary to ascertain the current appliance configuration, the configuration client 61 broadcasts a "ping" query message (step 65) to all appliances 62 currently interconnected within the bounded network domain. In response, each appliance 62 sends a response message (step 66) back to the configuration client 61. Each response includes the current configured network settings in use by each appliance 62. A response containing only the media access controller (MAC) address of the appliance 62 indicates that the appliance is currently unconfigured.

For each of the unconfigured appliances, the configuration client 61 sends a configuration packet request message (step 67) to the network operations center 63 via a secure session. The network operations center 63 determines the correct configuration settings required by the appliance to be configured by referencing an appliance status table 33 (shown in FIG. 2). The network operations center 63 generates a set of configuration parameters, which are sent (step 68) back to the requesting configuration client 61. The secure session is closed and the configuration client 61 forms a configuration packet for the unconfigured appliance 62.

The configuration client 61 sends the configuration packet (step 69) to the unconfigured appliance 64 where the configuration packet is processed and installed. The appliance 64 sends a "SUCCESS" message (step 70) to the configuration client 61 upon the successful configuration of the appliance. In response, the configuration client 61 returns a kick-start message (step 71) back to the appliance 64 to initiate an autonomous SecureBeat management session. Thereafter, the ongoing management of the appliance 64 is remotely facilitated by the network operations center 63.

If the configuration is unsuccessful, the appliance 64 sends a "FAILURE" message (step 72) back to the configuration client 61, which resends the configuration packet (step 69) until successful.

If the appliance 64 is still in the process of configuring, the appliance 64 sends an unconfigured message (step 73) back to the configuration client 61, which then waits until the appliance 64 has been configured. Thereafter, a SecureBeat management session is initiated.

Figure 6:
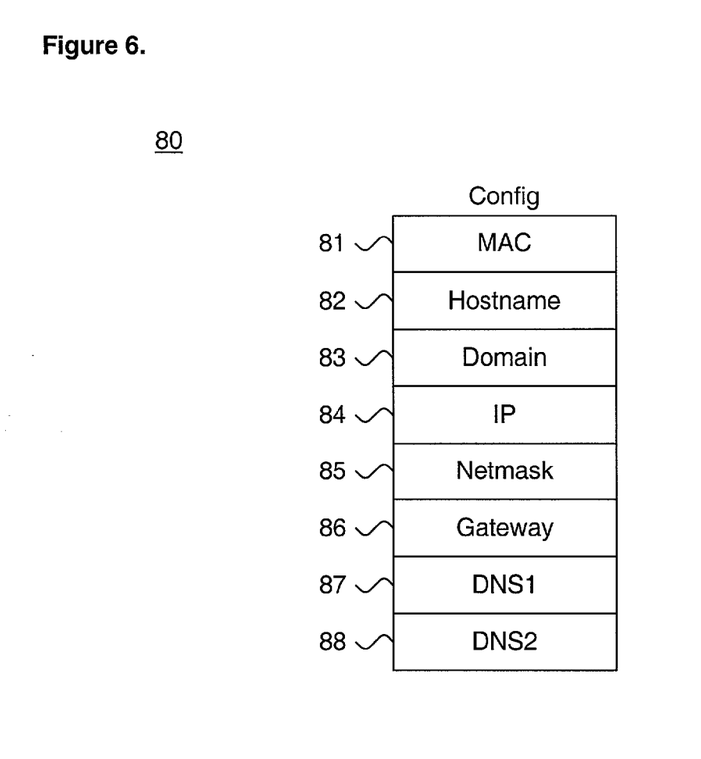
FIG. 6 is a data structure diagram showing a configuration packet served by the configuration client of FIG. 1.

FIG. 6 is a data structure diagram showing a configuration packet 80 served by the configuration client 16 of FIG. 1. Each configuration packet 80 contains the parameters described above with reference to FIG. 2.

While not necessary to completing an initial appliance configuration, the primary and secondary domain name server parameters 78 and 88, respectively, are optional and are provided for network administrative convenience.

Figure 7:
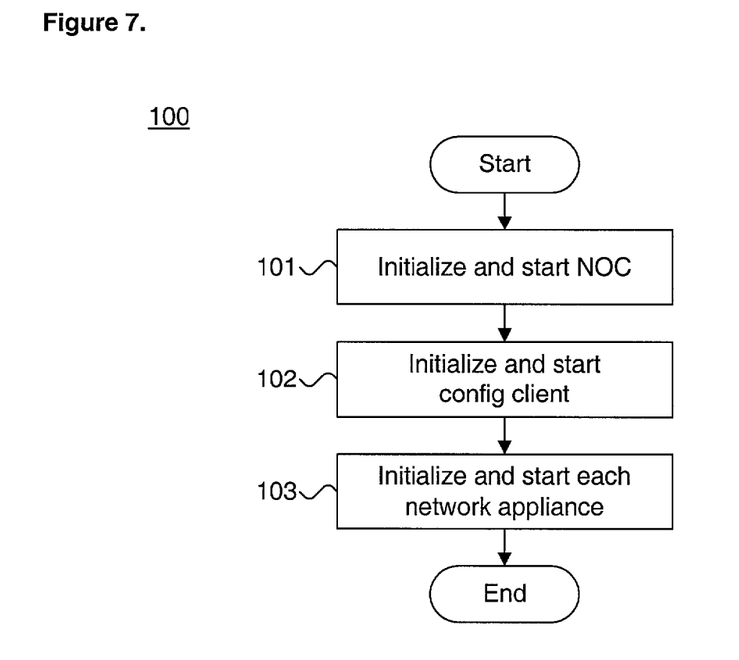
FIG. 7 is a flow diagram showing a method for providing Web browser-based secure remote network appliance configuration in a distributed computing environment, in accordance with the present invention.

FIG. 7 is a flow diagram 100 showing a method for providing Web browser-based secure remote network appliance configuration in a distributed computing environment, in accordance with the present invention. The individual components, including network operations center 12, configuration client 16 and individual network appliances 11a–c, execute independently. Each of the components must be initialized and started (blocks 101–103) prior to appliance configuration. Upon respective initialization and starting, each component proceeds independently, as further described below with reference to FIGS. 8–10.

Figure 8:
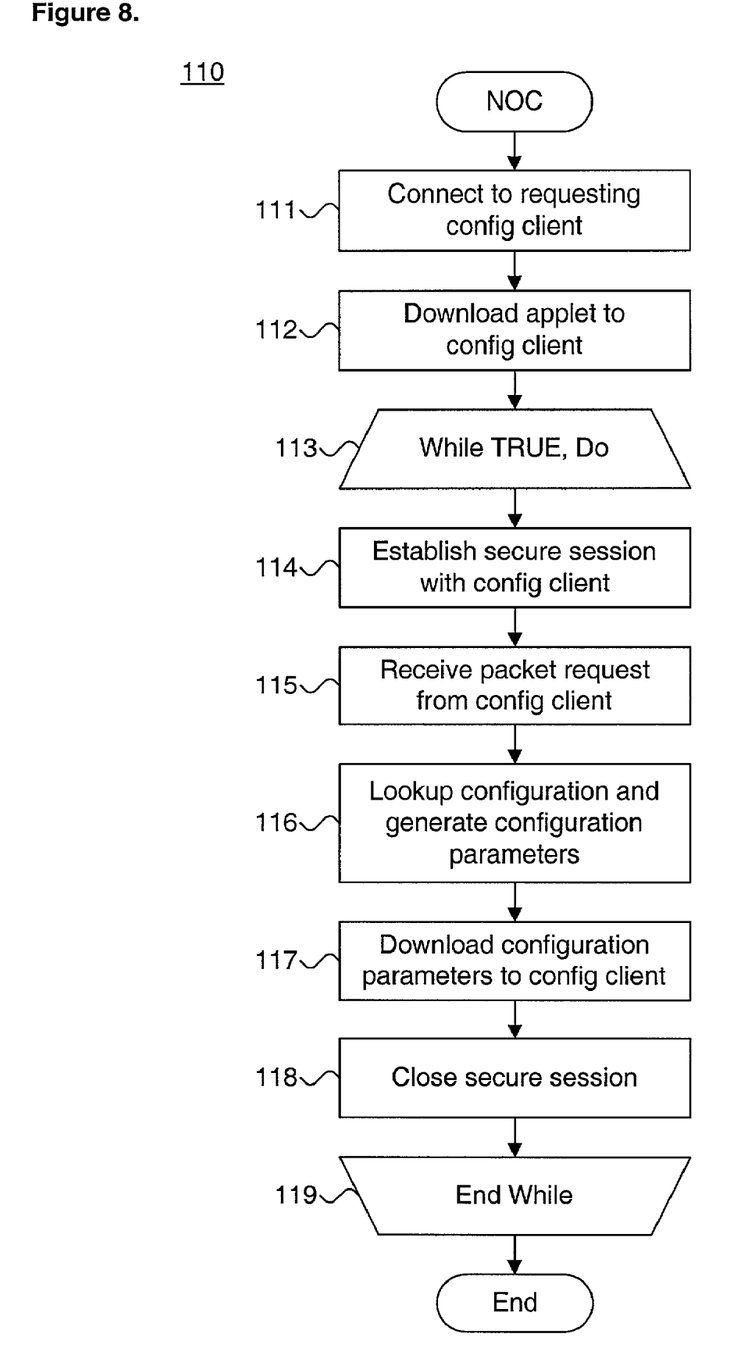
FIG. 8 is a flow diagram showing the process performed by the network operations center of FIG. 2.

FIG. 8 is a flow diagram 110 showing the process performed by the network operations center 12 of FIG. 2. Network operations center 12 begins by connecting to a configuration client 16 (shown in FIG. 1) requesting an applet 23 (shown in FIG. 2) (block 111). An applet 23 is downloaded to the configuration client 16 (block 112). Each configuration client 16 executes the applet 23 in a Web browser 17.

Following applet download (blocks 111–112), the network operations center 12 executes an iterative processing loop (blocks 113–119). During each iteration (block 113), a secure session is established with a configuration client 16 (block 114). Upon establishing a secure session, a configuration packet request is received (block 115). The network operations center 12 looks up the configuration 40 (shown in FIG. 2) for the configured appliance 11a and generates configuration parameters (block 116). The configuration parameters are downloaded to the configuration client 16 (block 117), after which the secure session is closed (block 118). Processing continues (block 119) until the process is terminated or halted.

Figure 9A:
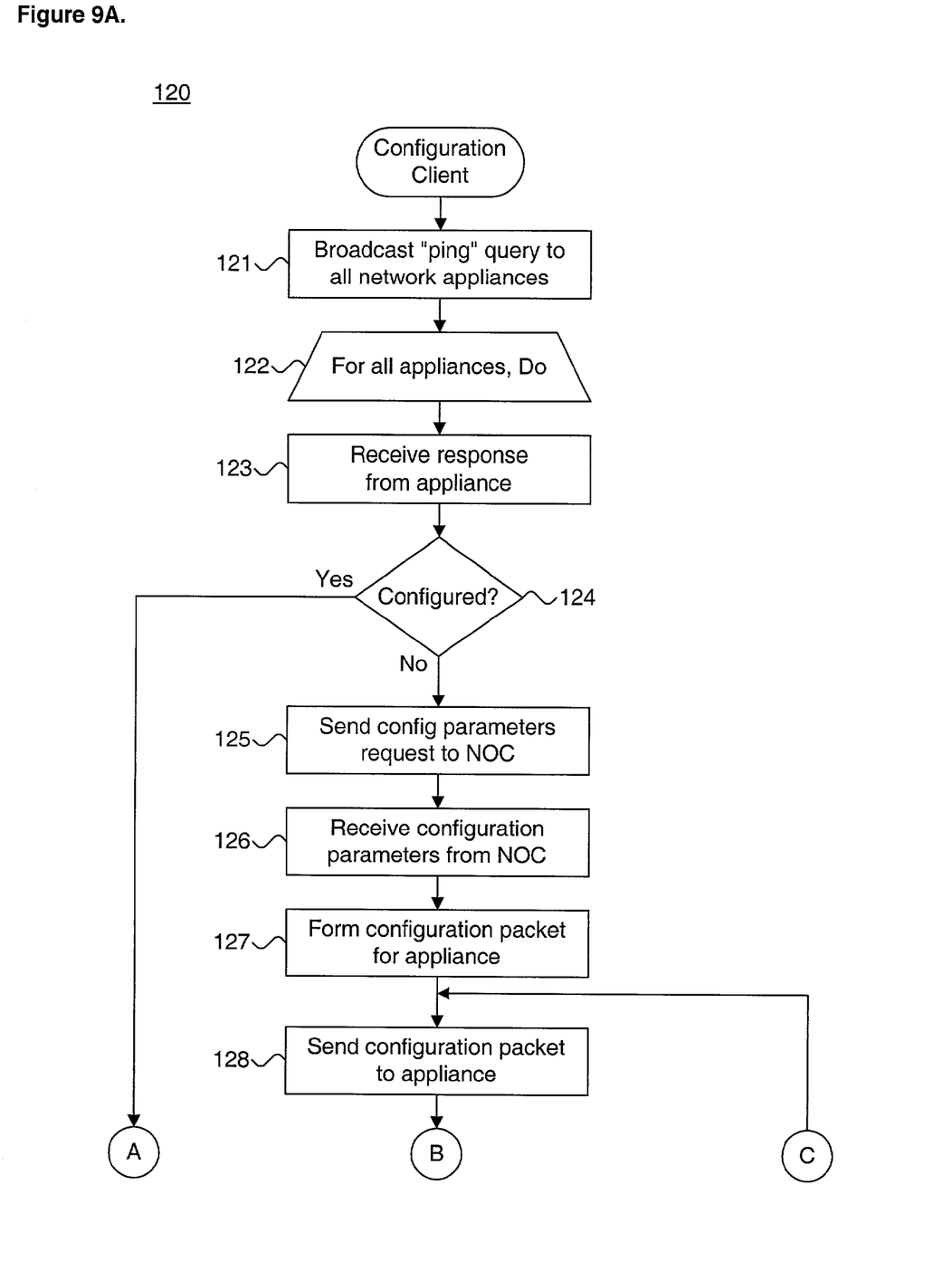
FIGS. 9A and 9B are flow diagrams showing the process performed by the configuration client of FIG. 1.
Figure 9B:
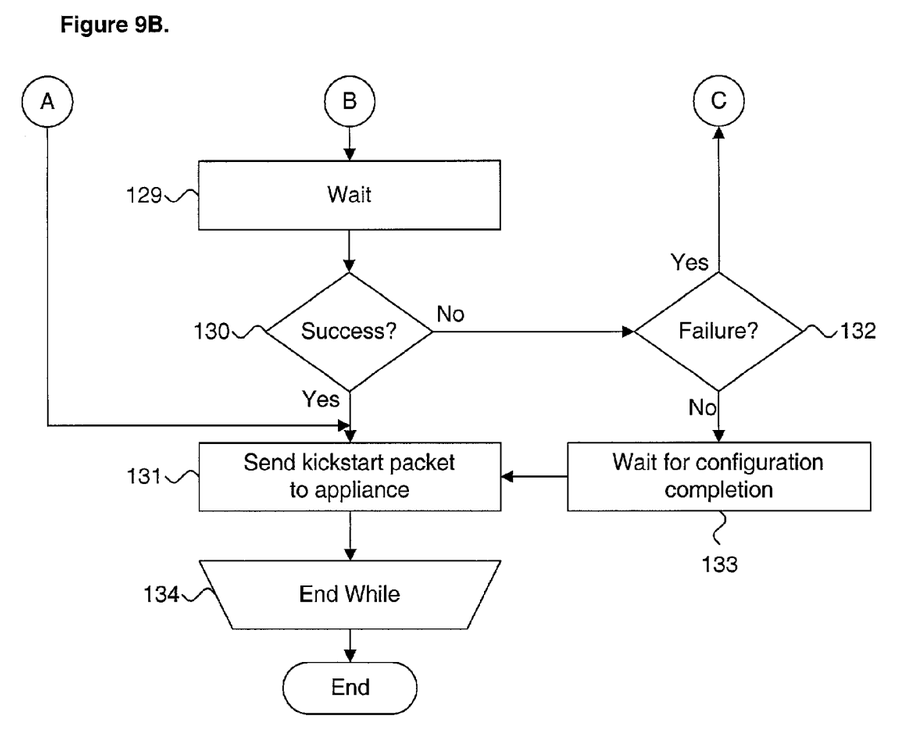

FIGS. 9A and 9B are flow diagrams 120 showing the process performed by the configuration client 16 of FIG. 1. The configuration client 16 begins by broadcasting a "ping" query message to all network appliances 11a–c (block 121) interconnected within the bounded network domain. The configuration client 16 then executes an iterative processing loop (blocks 122–133) for each appliance 11a–c.

During each iteration (block 122), a response from an appliance 11a is received (block 123) and processed as follows. If the response from the appliance 11a indicates that the appliance is not presently configured (block 124), a configuration parameters request is sent to the network operations center 12 (block 125). The network operations center 12 generates a set of configuration parameters which are then received (block 126) and formed into a configuration packet for the unconfigured appliance 11a (block 127). The configuration packet is sent to the appliance 11a (block 128).

The configuration client 16 awaits a status response from the appliance 11a (block 129). If the configuration succeeds (block 130), the configuration client 16 sends a kick-start packet to the appliance 11a (block 131), instructing the now-configured appliance 11a to initiate an autonomous SecureBeat management. Otherwise, if the configuration is not successful (block 130) and has failed (block 132), the configuration packet is sent again to the appliance 11a (block 128). Otherwise, the configuration client 16 waits for the completion of configuration by the appliance 11a (block 133), after which a kick-start packet is sent to the appliance 11a (block 131). Processing continues (block 134) until the process is terminated.

Figure 10:
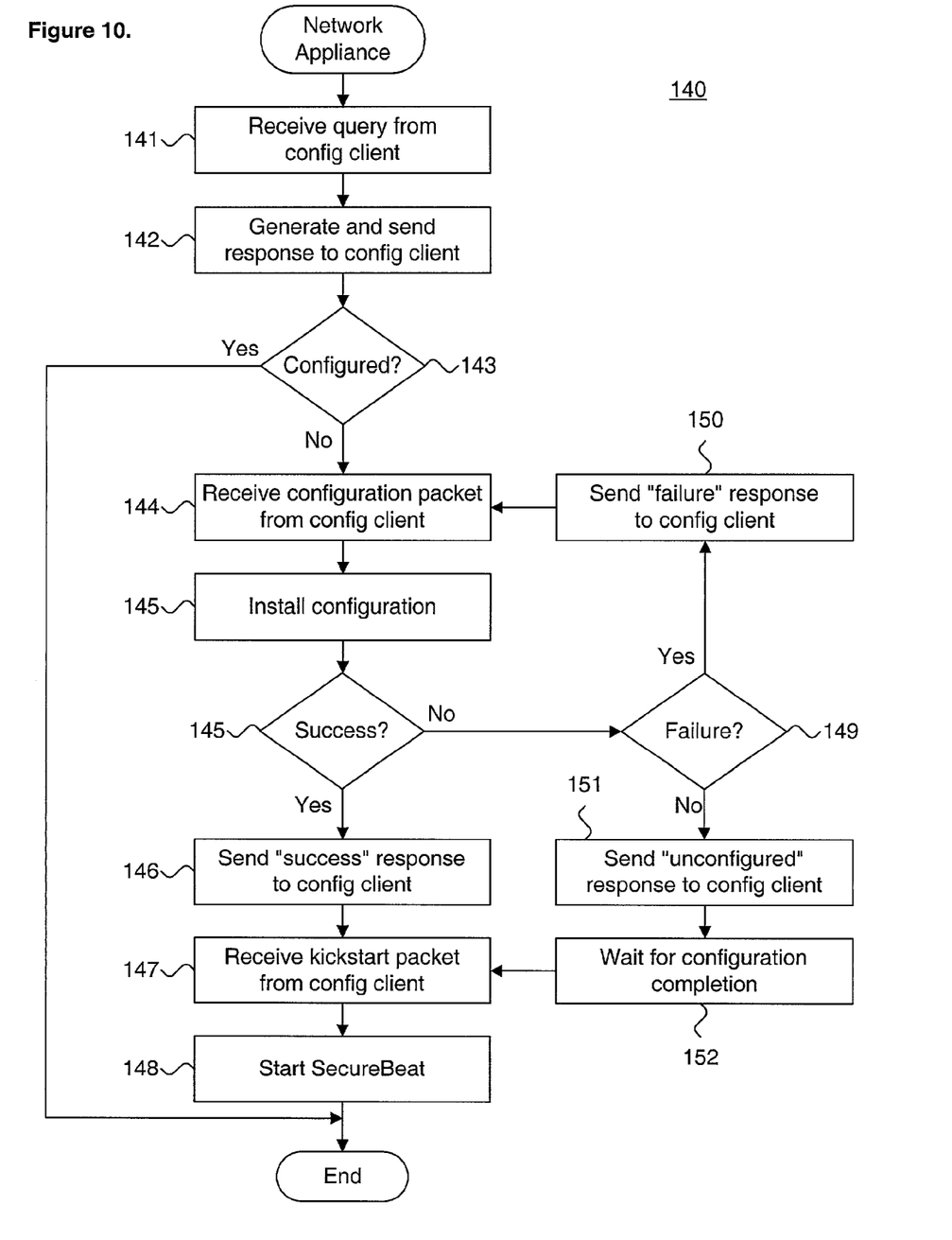
FIG. 10 is a flow diagram showing the process performed by the network appliance of FIG. 4.

FIG. 10 is a flow diagram 140 showing the process performed by the network appliance 11a of FIG. 4. Shortly following deployment into a network domain, or as necessary, a "ping" query message is received from a configuration client 16 (shown in FIG. 1) (block 141). In response to the query message, the network appliance 11a generates and sends a response back to the requesting configuration client 16 (block 142).

The response message includes the current network setting and configuration 55 (shown in FIG. 4) used by the network appliance 11a. If the network appliance is not currently configured (block 143), a configuration packet is received from the configuration client 16 (block 144) and installed (block 145). If the installation is successful (block 145), a "success" response message is sent back to the configuration client 16 (block 146). The network appliance 11a then receives a kick-start packet from the configuration client 16 (block 147) instructing the network appliance 11 a to initiate a remote SecureBeat management session (block 148). If installation is not successful (block 145) and fails (block 149), a "failure" response is sent back to the configuration client 16 (block 150), after which a further configuration packet is received from the configuration client 16 (block 144). Otherwise, if installation is still being performed (block 149), an "unconfigured" response is sent to the configuration client 16 (block 151) and the network appliance waits for configuration completion (block 152), after which a kick-start packet is received (block 147) and remote SecureBeat management session initiated (block 148).

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing Web browser-based remote network appliance configuration in a distributed computing environment, comprising:
   one or more network appliances interconnected within a bounded network domain defined by a common network address space;
   a configuration client comprising an applet executing within a Web browser and configuring the network appliances, comprising:
      a status module broadcasting a query message to the network appliances and processing a response message containing network settings, including a physical network address, received by the applet from at least one such network appliance responsive to the query message; and
      a configuration module generating and sending a configuration packet using the physical network address for each at least one such network appliance sending a response message and requiring configuration;
   a list of the network appliances maintained by the status module for each at least one such network appliance sending a response message not requiring configuration; and
   a completion module receiving a status message from each at least one such network appliance requiring configuration responsive to receipt of the configuration packet;
   wherein when the status message indicates an unsuccessful configuration, further comprising resending the configuration packet to the at least one such network appliance.

2. A system according to claim 1, wherein when the status message indicates a successful configuration, further comprising sending a kickstart message to each at least one such network appliance to initiate an autonomous management session.

3. A system according to claim 1, wherein when the status message indicates an on-going configuration, further comprising waiting for completion of configuration by the at least one such network appliance.

4. A system according to claim 1, further comprising:
an applet database storing a plurality of applets customized for execution within each such bounded network domain; and
an applet request module receiving the applet from the applet database and installing the applet into the Web browser prior to broadcasting the query message.

5. A system according to claim 4, wherein the applet is received in a secure session.

6. A system according to claim 1, further comprising:
a message queue storing instructions for the applet, comprising sending at least one of the query message and the configuration packet.

7. A system according to claim 1, further comprising:
a packet generator storing into the configuration packet values comprising at least one of hostname, domain, internet protocol address, netmask, gateway, primary domain name server, and secondary domain name server.

8. A system according to claim 1, wherein the bounded network domain is compliant with the TCP/IP and the configuration packet is compliant with the UDP.

9. A method for providing Web browser-based remote network appliance configuration in a distributed computing environment, comprising:
broadcasting a query message from an applet executing within a Web browser to one or more network appliances interconnected within a bounded network domain defined by a common network address space;
processing a response message containing network settings, including a physical network address, received by the applet from at least one such network appliance responsive to the query message;
generating and sending a configuration packet using the physical network address for each at least one such network appliance sending a response message and requiring configuration;
updating a list of the network appliances for each at least one such network appliance sending a response message and not requiring configuration; and
receiving a status message from each at least one such network appliance requiring confirmation responsive to receipt of the configuration packet;
wherein when the status message indicates an unsuccessful configuration, further comprising:
resending the configuration packet to the at least one such network appliance.

10. A method according to claim 9, wherein when the status message indicates a successful configuration, further comprising:
sending a kickstart message to each at least one such network appliance to initiate an autonomous management session.

11. A method according to claim 9, wherein the status message indicates an on-going configuration, further comprising:
waiting for completion of configuration by the at least one such network appliance.

12. A method according to claim 9, further comprising:
receiving the applet from an applet database storing a plurality of applets customized for execution within each such bounded network domain; and
installing the applet into the Web browser prior to broadcasting the query message.

13. A method according to claim 12, further comprising:
receiving the applet in a secure session.

14. A method according to claim 9, further comprising:
sending at least one of the query message and the configuration packet from the applet responsive to instructions maintained in a message queue.

15. A method according to claim 9, further comprising:
storing into the configuration packet values comprising at least one of hostname, domain, internet protocol address, netmask, gateway, primary domain name server, and secondary domain name server.

16. A method according to claim 9, wherein the bounded network domain is compliant with the TCP/IP and the configuration packet is compliant with the UDP.

17. A computer-readable storage medium holding code for performing the method according to claims 9, 10, 11, 12, 13, 14, 15, or 16.

18. A system for remotely configuring a network appliance deployed within a distributed computing environment, comprising:
at least one network appliance sending a response message containing network settings responsive to a query message broadcast over a specified network domain within which the at least one network appliance operates;
a configuration client generating a configuration package for the at least one network appliance and containing centrally managed network settings customized for the at least one network appliance;
a bootstrap module on the at least one network appliance installing the configuration package as part of an initialization bootstrap operation;
a library of applets for one or more Web browser-based configuration clients operating within the specified network domain;
a completion module sending a message comprising one of success, failure and unconfigured following configuration package installation at each such network appliance; and
a status daemon initializing a secure management session following successful configuration package installation on at least one such network appliance.

19. A system according to claim 18, further comprising:
a centrally managed library of configurations containing network settings for each such network appliance operating with the specified network domain.

20. A system according to claim 18, further comprising:
an applet server deploying one such applet from the library to each such configuration client using a secure session.

21. A system according to claim 18, further comprising:
a standardized user interface exported by the configuration client and providing configuration controls for a heterogeneous set of the network appliances.

22. A system according to claim 18, further comprising:
a package generator including at least one of a timestamp and a unique seed value in each such configuration package.

23. A system according to claim 18, wherein at least one such network appliance performs one of electronic mail anti-virus scanning, content filtering, packet routing, and file, Web and print servicing.

24. A system according to claim 18, wherein the distributed computing environment is TCP/IP-compliant.

25. A method for remotely configuring a network appliance deployed within a distributed computing environment, comprising:

sending a response message containing network settings from at least one network appliance responsive to a query message broadcast over a specified network domain within which the at least one network appliance operates;

generating a configuration package for the at least one network appliance and containing centrally managed network settings customized for the at least one network appliance;

installing the configuration package on the at least one network appliance as part of an initialization bootstrap operation;

maintaining a library of applets for one or more Web browser-based configuration clients operating within the specified network domain;

sending a message comprising one of success, failure and unconfigured following configuration package installation at each such network appliance; and initializing a secure management session following successful configuration package installation on at least one such network appliance.

26. A method according to claim 25, further comprising:

centrally managing a library of configurations containing network settings for each such network appliance operating with the specified network domain.

27. A method according to claim 25, further comprising:

deploying one such applet from the library to each such configuration client using a secure session.

28. A method according to claim 25, further comprising:

exporting a standardized user interface providing configuration controls for a heterogeneous set of the network appliances.

29. A method according to claim 25, further comprising:

including at least one of a timestamp and a unique seed value in each such configuration package.

30. A method according to claim 25, wherein at least one such network appliance performs one of electronic mail anti-virus scanning, content filtering, packet routing, and file, Web and print servicing.

31. A method according to claim 25, wherein the distributed computing environment is TCP/IP-compliant.

32. A computer-readable storage medium holding code for performing the method according to claims 25, 26, 27, 28, 29, 30, or 31.

* * * * *

UNITED STATES PATENT AND TRADEMARK OFFICE
CERTIFICATE OF CORRECTION

PATENT NO. : 7,240,102 B1
APPLICATION NO. : 10/057709
DATED : July 3, 2007
INVENTOR(S) : Kouznetsov et al.

It is certified that error appears in the above-identified patent and that said Letters Patent is hereby corrected as shown below:

col. 10, line 58 insert --and-- before "not" and after "message";
    col. 11, line 51 replace "confirmation" with --configuration--.

Signed and Sealed this

Ninth Day of February, 2010

David J. Kappos
*Director of the United States Patent and Trademark Office*